(12) United States Patent
Simpson

(10) Patent No.: US 6,946,417 B2
(45) Date of Patent: Sep. 20, 2005

(54) LIGHT-COLORED ESD SAFE CERAMICS

(75) Inventor: Matthew Simpson, Sudbury, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 39 days.

(21) Appl. No.: 10/442,616

(22) Filed: May 21, 2003

(65) Prior Publication Data

US 2004/0235639 A1 Nov. 25, 2004

(51) Int. Cl.$^7$ .......................... C04B 35/488; H01B 1/14
(52) U.S. Cl. ...................... 501/103; 501/104; 501/105; 252/520.2; 252/520.21; 252/520.22
(58) Field of Search ................................. 501/103, 104, 501/105; 252/520.2, 520.21, 520.22

(56) References Cited

U.S. PATENT DOCUMENTS

| | | | | |
|---|---|---|---|---|
| 3,726,700 | A | * 4/1973 | Wildt | .......................... 106/437 |
| 4,316,964 | A | 2/1982 | Lange | |
| 5,958,813 | A | 9/1999 | Aida et al. | |
| 6,136,232 | A | 10/2000 | Burlingame | |
| 6,258,426 | B1 | * 7/2001 | Yamamoto et al. | ........ 428/40.1 |
| 6,274,524 | B1 | 8/2001 | Shinji et al. | |
| 6,602,813 | B2 | * 8/2003 | Shinji et al. | ................. 501/103 |
| 6,669,871 | B2 | * 12/2003 | Kwon et al. | ........... 252/520.21 |
| 2002/0010069 | A1 | 1/2002 | Shinji et al. | |
| 2002/0177518 | A1 | 11/2002 | Kwon et al. | |
| 2003/0139279 | A1 | * 7/2003 | Niwa | .......................... 501/103 |
| 2004/0242401 | A1 | * 12/2004 | Zhang et al. | ............... 501/103 |

FOREIGN PATENT DOCUMENTS

| | | |
|---|---|---|
| EP | 0 773 201 A1 | 5/1997 |
| WO | WO 02/081402 A2 | 10/2002 |

* cited by examiner

*Primary Examiner*—Karl Group
(74) *Attorney, Agent, or Firm*—Toler, Larson & Abel LLP; Thomas G. Field, III

(57) ABSTRACT

Aspects of the present invention may be found in an electrostatic dissipative ceramic component having a stabilized zirconia base, a surface resistivity between $1\times10^5$ and $1\times10^{12}$ ohms per square and at least 2 percent by volume scattering material. The stabilized zirconia may be present in amounts between 60 and 95 weight percent. Further aspects of the invention may be found in an electrostatic dissipative ceramic material having stabilized zirconia, a resistivity modifier, and a scattering material. The stabilized zirconia may be present in amounts between 60 and 95 weight percent of the ceramic material. The resistivity modifier may be present in amounts between 5 and 30 weight percent. The scattering material may comprise at least 2 volume percent of the electrostatic dissipative ceramic material. The component may be used in the manufacturing of electronic component such as hard drives.

29 Claims, 3 Drawing Sheets

LIGHT-COLORED ESD SAFE CERAMICS

BACKGROUND

1. Field of the Invention

The present invention generally relates to ceramic materials having electrostatic discharge dissipative properties for safe discharge of electrostatic charges.

2. Description of the Related Art

In an increasingly technological age, electrostatic discharge can be costly or dangerous. Electrostatic discharge (ESD) can ignite flammable material, damage electronic components, attract contaminants in a clean environment, or cause products to stick together. The cost of these effects can be significant.

Electrostatic charges may build up through triboelectric processes. In these triboelectric processes, surfaces in contact develop opposite charges. When these surfaces separate, the charged differential remains. Charges may also build as a result of magnetic fields and other influences.

Damage to sensitive electronics can occur when these electrostatic charges discharge. Electrostatic discharge may alter the electrical characteristics of semiconductor device, degrading or destroying it. Electrostatic discharge may also upset operation of an electronic system, causing equipment malfunction or failure. Charged surfaces in clean room environments can attract and hold contaminants, making removal of the contaminants from the environment difficult. Electrostatic charge may also attract contaminants to the surface of a silicon wafer or an electronic circuitry. These contaminants can cause random defects and reduce product yield. Electrostatic discharge can also be dangerous in web manufacturing processes and processes for manufacturing flammable powders.

The cost of ESD damaged products can be significant. Some estimates place the cost of ESD damage to the electronics industry in the billions of dollars annually. When associated costs of repair, rework, shipping, labor, and overhead are included, the cost of ESD is significant.

Control of ESD is particularly important in the electronics industry, but this industry is relatively demanding, requiring high density, strong, ESD-safe materials that can be successfully implemented in various automated electronic fabrications processes.

In view of the foregoing, it is considered generally desirable to provide an improved electrostatic discharge dissipative material having suitable properties for use in demanding applications, including the electronics industry.

SUMMARY

Aspects of the present invention may be found in an electrostatic dissipative ceramic component having a stabilized zirconia base, a surface resistivity between $1\times10^5$ and $1\times10^{12}$ ohms per square and at least 2 percent by volume scattering material. The stabilized zirconia may be present in amounts between 60 and 95 weight percent.

Further aspects of the invention may be found in an electrostatic dissipative ceramic material having stabilized zirconia, a resistivity modifier, and a scattering material. The stabilized zirconia may be present in amounts between 60 and 95 weight percent of the ceramic material. The resistivity modifier may be present in amounts between 5 and 30 weight percent, and the scattering material may comprise at least 2 volume percent of the electrostatic dissipative ceramic material.

Addition aspects of the invention may be found in a method for manufacturing an electronic component. The method includes providing a support apparatus for supporting the electronic component, and processing the electronic component. The support apparatus comprises between 60 and 95 weight percent stabilized zirconia and at least 2 volume percent scattering material. The support apparatus may have a surface resistivity between $1\times10^5$ and $1\times10^{12}$ ohms per square.

Aspects of the invention may also be found in a method for manufacturing a hard drive. The method includes providing a support for a hard drive component and processing the hard drive component. The support comprises an electrostatic dissipative material comprising between 65 and 90 weight percent stabilized zirconia and at least 2 volume percent scattering material. The electrostatic dissipative material has a surface resistivity between $1\times10^5$ and $1\times10^{12}$ ohms per square.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
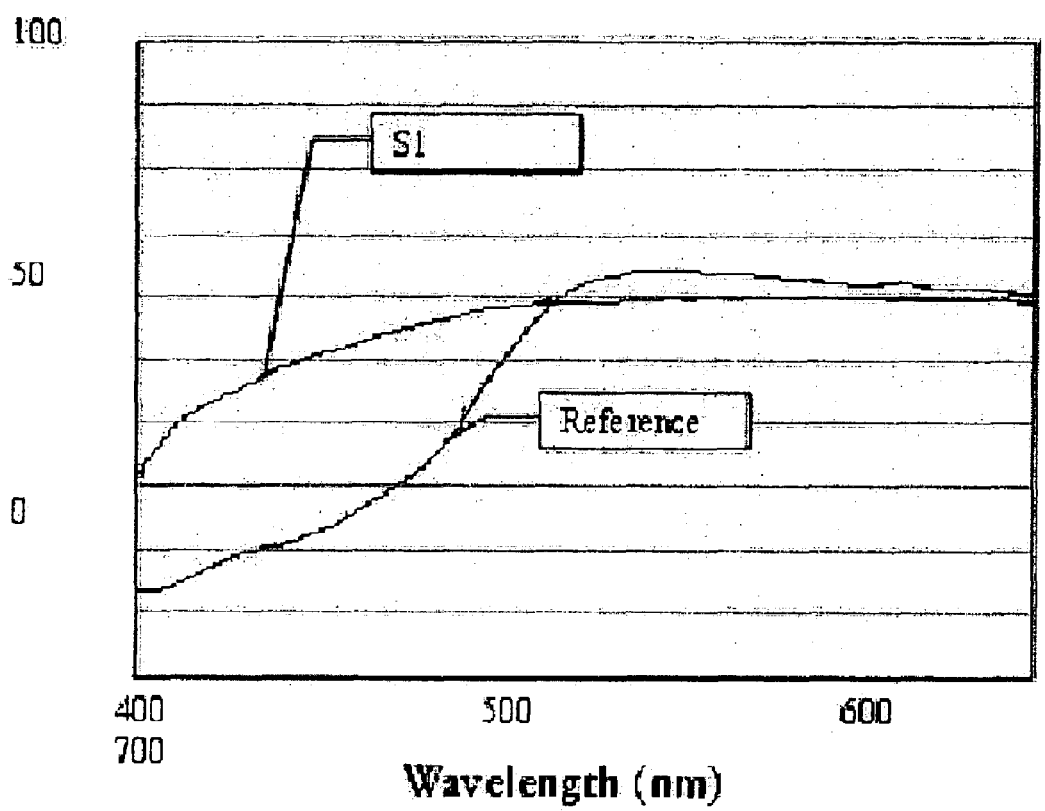
FIG. 1 depicts a comparison of diffuse reflectance between a reference and an exemplary material.

According to an embodiment of the present invention, an electrostatic dissipative ceramic component is provided that includes a stabilized zirconia base and a scattering material. The stabilized zirconia base comprises between 60 and 95 weight percent of the component and the scattering material comprises at least 2 volume percent of the component. The component may also comprise a resistivity modifier. The electrostatic dissipative ceramic component has a surface resistivity between $1\times10^5$ and $1\times10^{12}$ ohms per square and may have a volume resistivity between $1\times10^4$ and $1\times10^{11}$ ohm centimeters.

The stabilized zirconia may be stabilized with between 2.6 mole percent and 10 mole percent of a stabilizing metal oxide. Stabilizers include yttrium oxide, scandium oxide, rare earth oxides such as oxides of lanthanum, cerium, scandium, neodymium, ytterbium, erbium, gadolinium, samarium, and dysprosium, and alkaline earth oxide such as magnesia and calcia. More specifically, yttrium oxide may be used in mole percents between 2 and 10 mole percent, in some cases between 2.5 and 4.5 mole percent, and specific instances of 2.6, 2.8, and 3.0 mole percent, among others. Yttria partially stabilized zirconia (Y-PSZ) has excellent mechanical properties resulting from a portion of the zirconia being in a tetragonal structure. These mechanical properties are advantageous in ESD-safe material as they may be advantageously used to perform structural functions as well.

In an embodiment, the scattering material has light color, low refractive index, and stability against the rigors of ceramic processing. The material should be substantially non-reactive with the ceramic base and any resistivity reducing material under conditions such as those experienced in ceramic processing. Such scattering materials may include yttrium aluminum garnet (YAG), zinc aluminate, magnesium aluminate, stable phosphates such as yttrium phosphate, stable silicates such as magnesium silicate, stable alumino silicates such as beryllium alumino silicate, and stable fluorides such as calcium fluoride. These materials may be added as such in the mix to be sintered, or their constituents added and allowed to react in situ. For example, a mix of alumina and zinc oxide added to zirconia would produce zinc aluminate during sintering.

The refractive index of the scattering material may differ substantially from that of the base ceramic material. The indices may differ by at least 0.25. However, the indices may differ by 0.3, 0.5, or more. For example, refractive indices of YAG, zinc aluminate, and magnesium aluminate are 1.83, 1.879, 1.72, respectively. Each of these refractive indices differs by at least 0.25 from the refractive index of zirconia (2.2). The table below lists the refractive indices for example scattering materials.

| Material | Refractive index |
|---|---|
| YAG | 1.83 |
| Zinc Aluminate | 1.879 |
| Magnesium Aluminate | 1.72 |
| $YPO_4$ | 1.77 |
| $Mg_2SiO_4$ | 1.65 |
| $Be_3Al_2Si_6O_{18}$ | 1.58 |
| $CaF_2$ | 1.43 |

The scattering material may also be substantially non-reactive with the base ceramic material and any resistivity modifier and have a melting point above the ceramic processing temperatures. For example, yttrium aluminum garnet (YAG) is stable in the presence of 3 percent yttrium stabilized zirconia and zinc oxide under conditions as high as 1200° C. or 1400° C. On the other hand, a scattering material such as aluminum oxide may react with the zinc oxide to form a zinc aluminate under these conditions. As such, the preferred scattering material may vary with base material, resistivity modifier, and processing conditions.

The grain size of the scattering material may influence the efficacy of the material. A large grain size may be less effective in scattering light and small grain sizes may also be less effective in scattering. The scattering material may be most effective in grain sizes between 50 nm and 5 $\mu$m. The grain sizes may also be between 0.2 $\mu$m and 2 $\mu$m.

An exemplary component may be a light colored component with a relatively high diffuse reflectance in specific regions of the visible spectrum. The component may have a lightness L* of greater than about 50 based on the CIE 1976 L*a*b* scale. The lightness L* may be greater that 75 or 80. The component may also have a relatively higher diffuse reflectance in the blue and green regions of the visible spectrum. For example, the diffuse reflectance may be greater than 20 at 450 nm.

An exemplary component may also be relatively dense and have a high strength. The relative density may be greater than 95 percent of theoretical density. For example, the relative density may be not less than 98, 99, or 99.5 percent of theoretical density. The strength may be at least 600 MPa based on a 4-point test on a 3 mm ×4 mm ×50 mm bar. For example, the strength may be 700 MPa, 800 MPa, 900 MPa, or above 1100 MPa.

Zirconia alone tends to have a resistivity that is too high to reduce electrostatic build-up and discharge charges safely. Additives may be used to reduce the resistivity. Depending upon the application, the preferred resistivity may vary between $1 \times 10^5$ and $1 \times 10^{12}$ ohms per square (surface resistivity) and $1 \times 10^4$ to $1 \times 10^{11}$ ohm centimeters (volume resistivity). The additive is formed of a conductive or semi-conductive discrete particulate phase, which forms a distinct second phase within the base composition. Resistivity modifiers may include materials such as metal oxides, metal carbides, metal nitrides, metal oxycarbides, metal oxynitrides, and metal oxycarbonitrides, among others. The following table provides various combinations of base materials and resistivity modifier additives. Different resistivity modifiers or combinations of various resistivity modifiers with base materials may have differing effects on the resistivity of the material. In addition, various materials and combinations may have differing effects on the diffuse reflectance at a given wavelength or the lightness of color. For example, zinc oxide (ZnO) is a particularly effective additive for zirconia-based materials. However, ZnO may not exhibit the same behavior or may react with other based materials such as alumina.

| Base material (Insulator) | Semi-conductor type | General Formula | Resistivity modifier (Examples) |
|---|---|---|---|
| Zirconia | Carbide | MC | $B_4C$, SiC, TiC, $Cr_4C$, VC, ZrC, TaC, WC, graphite, carbon |
| Y-TZP | Nitride | MN | TiN, ZrN, HfN, |
| Ce-TZP | Boride | MB | $TiB_2$, $ZrB_2$, $CaB_6$, $LaB_6$, $NbB_2$, |
| Mg-PSZ | Silicide | MSi | $MoSi_2$, |
|  | Carbonitride | M(C,N) | Ti(C,N), Si(CN), |
|  | Single oxide | MO | NiO, FeO, MnO, $Co_2O_3$, $Cr_2O_3$, $Fe_2O_3$, $Ga_2O_3$, $In_2O_3$, $GeO_2$, $MnO_2$, $TiO_{2-x}$, $RuO_2$, $Rh_2O_3$, $V_2O_3$, $Nb_2O_5$, $Ta_2O_5$, $WO_3$, |
|  | Doped oxide | (M + m)O | $SnO_2$, ZnO, $CeO_2$, $TiO_2$, ITO, |
|  | Perovskite | $ABO_3$ ($AO.Ba_2$) | $MgTiO_3$, $CaTiO_3$, $BaTiO_3$, $SrTiO_3$, $LaCrO_3$, $LaFeO_3$, $LaMnO_3$, $YMnO_3$, $MgTiO_3F$, $FeTiO_3$, $SrSnO_3$, $CaSnO_3$, $LiNbO_3$, |
|  | Spinel | $AB_2O_4$ ($MO.Fe_2O_3$) | $Fe_3O_4$, $MgFe_2O_4$, $MnFe_2O_4$, $CoFe_2O_4$, $NiFe_2O_4$ $ZnFe_2O_4$, $CoFe_2O_4$, $CoFe_2O_4$, $FeAl_2O_4$, |

-continued

| Base material (Insulator) | Semi-conductor type | General Formula | Resistivity modifier (Examples) |
|---|---|---|---|
| | | | $MnAl_2O_4$, $ZnAl_2O_4$, $ZnLa_2O_4$, $FeAl_2O_4$, $MgIn_2O_4$, $MnIn_2O_4$, $FeCr_2O_4$, $NiCr_2O_4$, $ZnGa_2O_4$, $LaTaO_4$, $NdTaO_4$, |
| | Magnetoplumbite | $MO.6Fe_2O_3$ | $BaFe_{12}O_{19}$, |
| | Garnet | $3M_2O_3.5Fe_2O_3$ | $3Y_2O_3.5Fe_2O_3$ |
| ZTA | Other oxides | | $Bi_2Ru_2O_7$, |
| Alumina | | | $TiO_{2-x}$, |
| SiC | | | $Si_3N_4$ bonded |
| Silicon nitride | | | SiC, TiN, |
| SiAlON | | | TiN, Ti(O,N) |
| Aluminum nitride | | | TiN, |

In various exemplary embodiments, resistivity modifiers may be added in volume percents between 10 and 40 percent. For example, zinc oxide may be added to Y-PSZ in amounts between 15 and 35 percent volume. In other examples, $LaMnO_3$ may be added in amounts between 20 and 30 percent volume, $LaCrO_3$ may be added in amounts between 10 and 40 percent volume, ZrC may be added in amounts between 10 and 25 percent volume, and $BaO.6Fe_2O_3$ may be added in amounts near 25 percent volume. In one exemplary embodiment having a base material of yttria stabilized toughned zirconia polycrystals (Y-TZP), tin oxide and zinc oxide may be preferred as they are less expensive, less toxic, and lighter in color.

In one particular embodiment, the electrostatic dissipative ceramic component may comprise between 70 and 85 weight percent stabilized zirconia, between 15 and 25 weight percent zinc oxide, and greater than 2 volume percent YAG.

In another particular embodiment, an electrostatic dissipative ceramic material may have between 60 and 95 weight percent stabilize zirconia, 5 to 30 percent resistivity modifier, and at least 2 volume percent of scattering material. Depending on conditions such as the type of resistivity modifier, quantity of resistivity modifier, and process conditions, the surface resistivity of the material may be between $1 \times 10^5$ and $1 \times 10^{12}$ ohms per square. The volume resistivity may be between $1 \times 10^4$ and $1 \times 10^{11}$ ohm centimeters. The material may have a lightness L* of 50 based on the CIE 1976 L*a*b* scale. The material may also have a diffuse reflectance of greater than 20 at 450 nm. The relative density of the material may be greater than 95, 98, or 99.

In another exemplary embodiment, the ceramic material may include between 60 and 95 weight percent zirconia and a scattering material. The surface resistivity may be between $1 \times 10^5$ and $1 \times 10^{12}$ ohms per square period. The scattering material may have a refractive index differing by at least 0.25 from that of zirconia. The volume resistivity may be between $1 \times 10^4$ and $1 \times 10^{11}$ ohm centimeters. The electrostatic dissipative ceramic material may have a lightness L* of greater that 50 and a diffuse reflectance of greater than 20 at 450 nm. The material may also have a density greater than 98.

Another example of the electrostatic dissipative ceramic material has a surface resistivity between $1 \times 10^5$ and $1 \times 10^{12}$ ohms per square, has a relative density of at least 98, and includes a ceramic base and between 0.2 and 10 weight percent scattering material. The scattering material may be YAG, zinc aluminate, magnesium aluminate, yttrium phosphate, magnesium silicate, beryllium alumino silicate or calcium fluoride, among others. The scattering material may be a phosphate, silicate, alumino silicate or fluoride among others.

According to an aspect of the present invention, certain components, such as tools, carriers, and parts, are made with ESD-safe or electrostatic dissipative materials. Adequately strong and mechanically robust ESD-safe materials tend to be dense or have a low porosity. The present invention may, for example, result in lighter colored, dense ceramics. Many processes in this industry have been automated using vision systems. These vision systems often rely on contrast between materials to effectively determine the location of parts. A strong contrast between parts, tooling, automated mechanisms, and manufacturing surfaces can improve the operation of these automated systems. For example, the color of magnetic recording heads is substantially black. Use of a light ESD dissipative tooling may improve optical recognition and performance of vision systems.

Additional aspects of the invention may be found in methods for manufacturing an electronic component. The method includes providing a support apparatus for supporting the electronic component, and processing the electronic component. The support apparatus comprises between 60 and 95 weight percent stabilized zirconia and at least 2 volume percent scattering material. The support apparatus may have a surface resistivity between $1 \times 10^5$ and $1 \times 10^{12}$ ohms per square.

The support apparatus may be a jig, tool, carrier, or other manufacturing component. In one example, the electronic component is a magneto-resistive head. The processing may including lapping or machining of magneto-resistive head bearing surfaces.

Aspects of the invention may also be found in a method for manufacturing a hard drive. The method includes providing a support for a hard drive component and processing the hard drive component. The support comprises an electrostatic dissipative material comprising between 65 and 90 weight percent stabilized zirconia and at least 2 volume percent scattering material. The electrostatic dissipative material has a surface resistivity between $1 \times 10^5$ and $1 \times 10^{12}$ ohms per square.

The hard drive component may, for example, be a magento-resistive head. The processing may include lapping, machining, and pick and place processes. The support may be a jig.

EXAMPLES

Example 1

Powders of 3 mole percent yttrium oxide stabilized zirconia, zinc oxide, and yttrium aluminum garnet were mixed in the ratios of 70 weight percent, 17.5 weight percent, and 12.5 weight percent respectively. A reference having 82 percent yttrium stabilized zirconia and 18 percent zinc oxide was also prepared. The reference and sample were pressed into pellets, fired at 1400° C. for one hour, and hot isostatically pressed at 200 MPa in argon for 45 minutes at 1350° C. This process yielded a sample and reference with relative densities greater than 98 percent. The samples where then annealed in air at 650° C. until the surface resistance exceeded 2 MΩ. The surface resistance was measured with a PRF-912 surface resistance probe from Prostat Corp. of Bensonville, Ill. The results are presented in the table below.

| Sample | $ZrO_2$—$Y_2O_3$ | ZnO | YAG | Surface resistance (MΩ) |
|---|---|---|---|---|
| Reference (no YAG) | 82 | 18 | 0 | 2.4 |
| S1 | | 70 | 17.5 | 12.5 | 4.5 |

The diffuse reflectance from the sample and reference was measure with a Miniscan XE plus spectrometer made by Hunter Associates Laboratory of Reston, Va. As is shown in FIG. 1, the diffuse reflectance from the sample S1 is higher on average than that of the reference material. In particular, in the blue end of the spectrum, the diffuse reflectance of the sample is significantly greater than that of the reference material. The CIE L*a*b* values are shown in the table below. The L* measurement indicated lightness and varies between 0 and 100, wherein 100 is white and 1 is black. The a* measurement indicates redness when positive and greenness when negative. The b* measurement indicates yellowness when positive and blueness when negative. The sample indicates a comparable lightness to the reference. However, the sample shows a more red and less yellow color than that of the reference.

| Sample | L* | a* | b* |
|---|---|---|---|
| S1 | 80.84 | −2.30 | 9.56 |
| Reference | 78.78 | −0.58 | 41.53 |

Example 2

A number of samples were prepared using the same processing cycle as Example 1. The compositions of the samples are shown in the table below. In each case, the balance of the material is a mixture of 18.7 weight percent zinc oxide and 81.3 weight percent zirconium oxide. The last column of the table indicates that volume fraction of the scattering material additive, assuming no significant mutual solution of the scattering material and the other constituents of the samples. Extra zinc oxide was also added with the additive to hold the volume fraction of zinc oxide at 20 percent, again ignoring mutual solubilities.

| Sample ID | wt % YAG | wt % $ZnAl_2O_4$ | wt % $MgAl_2O_4$ | wt % ZnO added to mix to maintain 20 vol % ZnO | Eq. vol % additive |
|---|---|---|---|---|---|
| RM3-1 | 0.23 | | | 0.07 | 0.3 |
| RM3-2 | 0.23 | | | 0.07 | 0.3 |
| RM3-5 | 0.78 | | | 0.24 | 1 |
| RM3-6 | 0.78 | | | 0.24 | 1 |
| RM3-9 | 2.36 | | | 0.71 | 3 |
| RM3-10 | 2.36 | | | 0.71 | 3 |
| RM3-13 | 7.99 | | | 2.41 | 10 |
| RM3-14 | 7.99 | | | 2.41 | 10 |
| RM3-23 | | 7.92 | | 2.41 | 10 |
| RM3-25 | | | 6.27 | 2.41 | 10 |

After the hot isostatic pressing cycle, the sample faces were ground and the samples were heated in air at 650° C. until the surface resistance exceeded 1 MΩ. The diffuse reflectance spectra was determined with a Miniscan XE plus spectrometer and the CIE L*, a*, b* scale is presented in the table below. The surface resistance in MΩ is shown to vary from 1.16 to 703 MΩ. The L* measurements range from 75.14 to 85.79. The a* measurements range from −1.71 to 1.15, and the b* measurements range from 10.85 to 40.34. The diffuse reflectance at 450 nm ranges from 20.2 to 43.27. These results are show in graphical form in FIGS. 2 and 3.

| Sample ID | Surface resistance (MΩ) | L* | a* | b* | Diffuse reflectance at 450 nm |
|---|---|---|---|---|---|
| RM3-1 | 45.3 | 75.54 | 0.96 | 38.76 | 20.22 |
| RM3-2 | 13.7 | 75.8 | −0.7 | 36.23 | 21.76 |
| RM3-5 | 1.56 | 77.55 | −1.11 | 34.11 | 24.96 |
| RM3-6 | 3.93 | 78.9 | −0.58 | 35.27 | 25.54 |
| RM3-9 | 34.1 | 81.26 | 2.11 | 40.34 | 24.07 |
| RM3-10 | 11.3 | 80.76 | −0.95 | 33.42 | 28.63 |
| RM3-13 | 3.52 | 79.82 | −0.91 | 21.05 | 37.1 |
| RM3-14 | 10.9 | 82.98 | −1.71 | 19.01 | 43.27 |
| RM3-22 | 0.012 | 82.9 | −3.91 | 23.35 | 39.12 |
| RM3-23 | 1.16 | 85.79 | 1.15 | 36.84 | 28.51 |
| RM3-25 | 703 | 75.14 | −2.16 | 10.85 | 39.63 |

Figure 2:
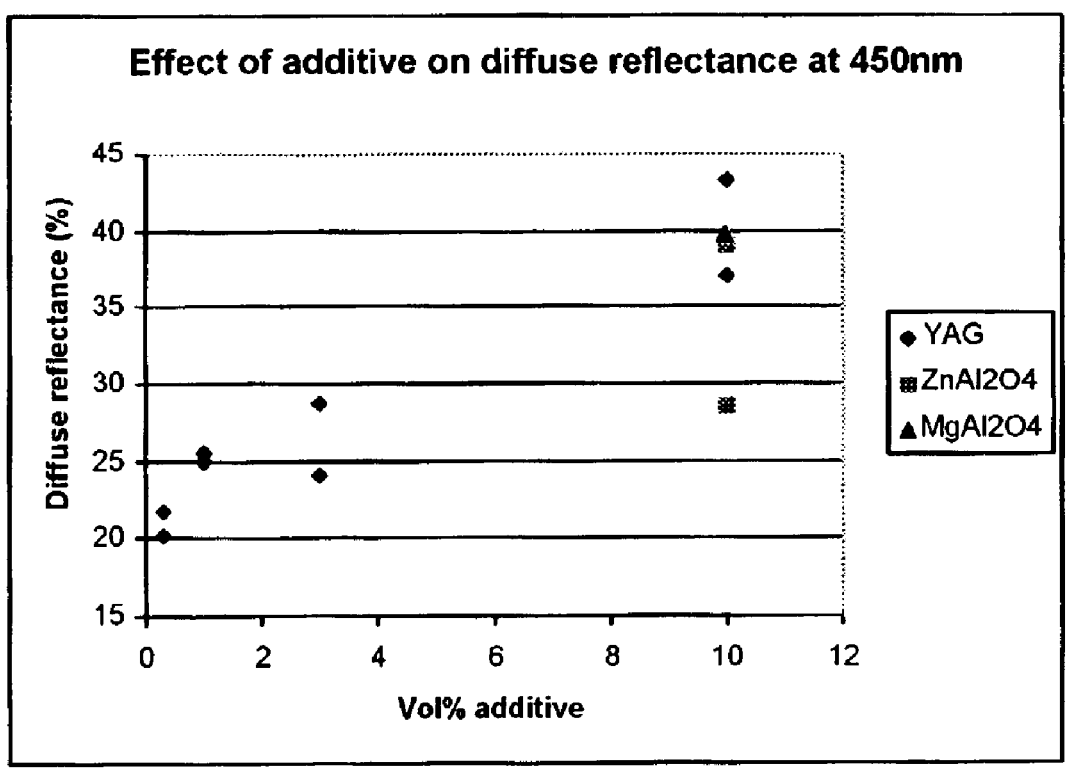
FIG. 2 depicts the effect of additives on diffused reflectance.

FIG. 2 shows the effects of the scattering material additive on the diffuse reflectance at 450 nm. The domain axis indicates the volume percentage of the additive, while the range axis indicates the percentage of diffuse reflectance. For increasing volume percent of YAG, the diffuse reflectance is shown to increase from 20 percent to as much as 43.27 percent. At approximately 10 volume percent additive of zinc aluminate or magnesium aluminate, the diffuse reflectance at 450 nm is 28.51 and 39.63 respectively. Even relatively small amounts of yttrium aluminum garnet, have an impact on the diffuse reflectance. The preferred range is greater than 2 volume percent additive.

Figure 3:
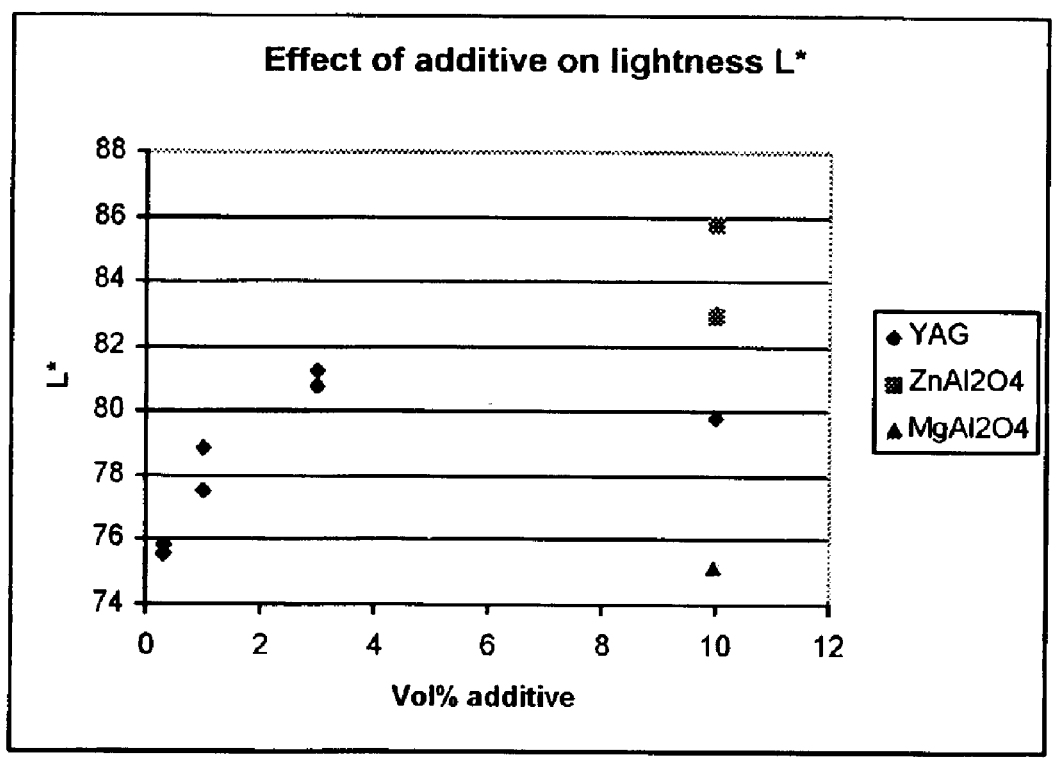
FIG. 3 shows the effect of additives on lightness L*.

FIG. 3 depicts the effect of the additive on the lightness L*. The domain axis represents volume percent additive and the range axis represents L*. Here too, increasing quantities of YAG result in increased L* values. At ten volume percent, zinc aluminate results in an L* value of 85.79, and magnesium aluminate results in an L* value of 75.14.

In each of these examples, the grain size of the additive was less than 5 μm. In general the grain size may be between 0.05 μm and 5 μm, preferably between 0.2 μm and 2 μm.

What is claimed is:

1. An electrostatic dissipative ceramic component comprising between 60 and 95 weight percent stabilized zirconia, at least 2 volume percent scattering material having a refractive index at least 0.25 less than the refractive index of zirconia, the component having a surface resistivity between $1\times10^5$ and $1\times10^{12}$ ohms per square and a lightness L* greater than about 50.

2. The electrostatic dissipative ceramic component of claim 1, wherein the volume resistivity is between $1\times10^5$ and $1\times10^{11}$ ohm centimeters.

3. The electrostatic dissipative ceramic component of claim 1, having lightness L* of greater than about 75.

4. The electrostatic dissipative ceramic component of claim 1, having greater than about 95 percent of theoretical density.

5. The electrostatic dissipative ceramic component of claim 1, having greater than about 98 percent of theoretical density.

6. The electrostatic dissipative ceramic component of claim 1, having greater than about 99 percent of theoretical density.

7. The electrostatic dissipative ceramic component of claim 1, having a diffuse reflectance of greater than 20 percent at 450 nm.

8. The electrostatic dissipative ceramic component of claim 1, wherein the grain size of the scattering material is between about 0.05 µm and about 5 µm.

9. The electrostatic dissipative ceramic component of claim 1, wherein the grain size of the scattering material is between 0.2 µm and 2 µm.

10. An electrostatic dissipative ceramic component comprising between 60 and 95 weight percent stabilized zirconia and at least 2 volume percent scattering material, wherein the component has a surface resistivity between $1\times10^5$ and $1\times10^{12}$ ohms per square, and wherein the scattering material is selected from the group consisting of yttrium aluminum garnet, zinc aluminate, magnesium aluminate, yttrium phosphate, magnesium silicate, beryllium aluminosilicate, and calcium fluoride.

11. An electrostatic dissipative ceramic component comprising between 60 and 95 weight percent stabilized zirconia and at least 2 volume percent scattering material, wherein the component has a surface resistivity between $1\times10^5$ and $1\times10^{12}$ ohms per square, and wherein the scattering material is selected from the group consisting of phosphates, silicates, aluminosilicates, and fluorides.

12. The electrostatic dissipative ceramic component of claim 1, wherein the scattering material has a melting point above 1200° C. and does not substantially react with zirconia at 1200° C.

13. The electrostatic dissipative ceramic component of claim 1, further comprising a resistivity modifier.

14. An electrostatic dissipative ceramic component comprising between 60 and 95 weight percent stabilized zirconia, a resistivity modifier selected from the group consisting of zinc oxide, tin oxide, indium oxide, gallium oxide, and cadmium oxide, and at least 2 volume percent scattering material, wherein the component has a surface resistivity between $1\times10^5$ and $1\times10^{12}$ ohms per square.

15. The electrostatic dissipative ceramic component of claim 1, having a flexural strength of greater than 600 MPa based on a 4-point bending test.

16. The electrostatic dissipative ceramic component of claim 1, having a flexural strength of at least 800 MPa based on a 4-point bending test.

17. The electrostatic dissipative ceramic component of claim 1, having a flexural strength of at least 900 MPa based on a 4-point bending test.

18. The electrostatic dissipative ceramic component of claim 1, having a flexural strength of at least 1100 MPa based on a 4-point bending test.

19. The electrostatic dissipative ceramic component of claim 1, comprising between 70 and 85 weight percent stabilized zirconia, between 15 and 25 weight percent zinc oxide, and at least 2 volume percent yttrium aluminum garnet.

20. An electrostatic dissipative ceramic component comprising between 60 and 95 weight percent stabilized zirconia, between 5 and 30 weight percent resistivity modifier, and at least 2 volume percent scattering material having a refractive index at least 0.25 less than the refractive index of zirconia, the component having a lightness L* greater than about 50.

21. The electrostatic dissipative ceramic component of claim 20, wherein the surface resistivity is between $1\times10^5$ and $1\times10^{12}$ ohms per square.

22. The electrostatic dissipative ceramic component of claim 20, having greater than about 95 percent of theoretical density.

23. The electrostatic dissipative ceramic component of claim 20, having a diffuse reflectance of greater than 20 percent at 450 nm.

24. The electrostatic dissipative ceramic component of claim 20, wherein the grain size of the scattering material is between about 0.05 µm and about 5 µm.

25. An electrostatic dissipative ceramic component comprising between 60 and 95 weight percent stabilized zirconia, between 5 and 30 weight percent resistivity modifier, and at least 2 volume percent scattering material, wherein the scattering material is selected from the group consisting of yttrium aluminum garnet, zinc aluminate, magnesium aluminate, yttrium phosphate, magnesium silicate, beryllium aluminosilicate, and calcium fluoride.

26. The electrostatic dissipative ceramic component of claim 20, wherein the scattering material comprises between 2 and 10 volume percent of the electrostatic dissipative ceramic material.

27. The electrostatic dissipative ceramic component of claim 20, having a flexural strength of greater than 600 MPa based on a 4-point banding test.

28. The electrostatic dissipative ceramic component of claim 20, comprising between 70 and 85 weight percent stabilized zirconia, between 15 and 25 weight percent zinc oxide, and at least 2 volume percent yttrium aluminum garnet.

29. An electrostatic dissipative ceramic component comprising between 60 and 95 weight percent stabilized zirconia, between 5 and 30 weight percent resistivity modifier, and at least 2 volume percent scattering material, wherein the scattering material is selected from the group consisting of phosphates, silicates, aluminosilicates, and fluorides.

* * * * *

UNITED STATES PATENT AND TRADEMARK OFFICE
CERTIFICATE OF CORRECTION

PATENT NO. : 6,946,417 B2
DATED : September 20, 2005
INVENTOR(S) : Matthew Simpson It is certified that error appears in the above-identified patent and that said Letters Patent is hereby corrected as shown below:

Column 9,
Line 5, delete "$1X10^5$" and insert -- $1X10^4$ --.

Column 10,
Line 45, delete "banding" and insert -- bending --.

Signed and Sealed this

Fourteenth Day of March, 2006

JON W. DUDAS
*Director of the United States Patent and Trademark Office*